United States Patent

[11] 3,601,165

| [72] | Inventor | Hirokazu Obata |
| | | 5588, Kawarashiromachi, Ryugasaki, Ibaragi, Japan |
| [21] | Appl. No. | 747,065 |
| [22] | Filed | June 24, 1968 |
| [45] | Patented | Aug. 24, 1971 |
| | | Continuation-in-part of application Ser. No. 508,722, Nov. 19, 1965, now abandoned. |

[54] LIQUEFIED-GAS-FUELED LIGHTERS
9 Claims, 17 Drawing Figs.

[52] U.S. Cl. .............................................. 141/302, 251/363, 141/295
[51] Int. Cl. .................................................. B65b 1/04, B65b 3/04
[50] Field of Search ........................................ 141/291, 292, 293, 294, 295, 296, 302; 251/332, 361, 363, DIG. 1; 137/389

[56] References Cited
UNITED STATES PATENTS

| 3,282,307 | 11/1966 | Harikae | 141/295 |
| 3,307,595 | 3/1967 | Berning | 141/293 X |
| 3,358,964 | 12/1967 | Cohen | 251/361 X |
| 1,368,884 | 2/1921 | Bozerman | 137/389 |
| 2,381,484 | 8/1945 | Blank | 251/DIG. 1 |
| 2,878,896 | 3/1959 | Farrell | 251/264 X |
| 2,847,182 | 8/1958 | Mancusi | 251/332 |
| 2,971,090 | 2/1961 | Piet | 251/DIG. 1 |
| 3,072,157 | 1/1963 | Iketani | 141/293 |
| 3,174,519 | 3/1965 | Pizzurro | 141/295 |
| 3,189,046 | 6/1965 | Callahan | 251/363 X |
| 3,195,590 | 7/1965 | Iketani | 141/295 X |
| 3,221,782 | 12/1965 | Zellweger | 141/302 X |
| 3,265,102 | 8/1966 | Yoshinaga | 141/295 |

Primary Examiner—Herbert F. Ross
Attorney—Paul S. Martin

ABSTRACT: Cigarette lighter tanks are here equipped with novel valves for refilling the tanks with liquefied gas such as butane. The nozzle of a supply container presses a movable valve member away from an O-ring valve seat, initially allowing gas to vent from the tank. Then the nozzle bears against a fixed part of the valve, opening the valve in the supply container and allowing the tank to fill. The O-ring is squeezed between an outer flange and an inner tube, giving it a tensioned surface that guards against leaks by ejecting dirt particles to which the valve is exposed. The outer flange overlies the outer side of the O-ring, protecting the O-ring from thrust engagement by the filling nozzle. In a preferred valve, the movable valve member is a ball, the outer flange is immediately adjacent the tank exterior, and there is no dirt cover.

INVENTOR
HIROKAZU OBATA
BY Paul S. Martin
ATTORNEY

INVENTOR.
HIROKAZU OBATA
BY
ATTORNEY

LIQUEFIED-GAS-FUELED LIGHTERS

This application is a continuation-in-part of my copending application Ser. No. 508,722 filed Nov. 19, 1965.

The present invention relates to liquefied-gas-fueled lighters and, in particular, to lighters of that type having refilling valves.

It is a principal object of the invention to provide the fuel tank or reservoir of a liquefied-gas-fueled lighter with a novel refilling valve assembly that is simple in construction dependable in operation and adapted for cooperation with the nozzle of a fuel supply container.

Another object of the invention is to provide a liquefied-gas-fueled lighter with an improved refilling valve assembly having a novel resilient valve seat that is especially effective in such lighters. Lighters of the type here involved are vulnerable to the danger of dirt that can reach the valve seat, allowing fuel to escape. To minimize this danger, most lighters of this class have a removable valve cover. Even in such cases, there is danger of dirt being introduced into the valve mechanism when the nozzle of a refilling container is inserted. A related important object of the invention resides in providing a fuel tank of a liquefied-gas-fueled lighter with a novel reliable refilling valve assembly that avoids the need for a valve cover.

A still further object of the invention is to provide the tank of a liquefied-gas-fueled lighter with a refilling valve assembly having a resilient valve seat for a ball valve member that forms a stable seal independent of variation in the temperature or the pressure within the fuel tank.

An ideal procedure for refilling the tank or reservoir of such a lighter involves, first, a momentary venting of the reservoir or tank of the lighter. This is followed by a filling operation in which the supply container is above the lighter tank, the refilling nozzle is sealed to the tank, and a valve of the supply container is opened to allow flow of liquid fuel into the tank and to allow equalization of pressures. This procedure achieves proper filling operation, such as occurs when there is continuous venting during the filling operation.

A further important object of this invention resides in providing a variety of novel refilling valves of simplified yet highly reliable construction that can be effectively used with various commercially available forms of refilling nozzles, operating in accordance with the foregoing ideal refilling procedure.

The various objects of the invention are achieved in several illustrative embodiments which are shown in the accompanying drawings and described in detail below. In each embodiment, there is a fuel-containing tank having a refilling passage through a wall of the tank, the passage having a refilling valve. The valve is vulnerable to leakage due to its exposure to dirt. In each of the embodiments, the valve has first and second coaxial screw-threaded tubular parts, one threaded into the other. These parts have opposed annular abutment surfaces about the passage, and between them they grip the outer annular portion of a gastight elastomer ring that has a smooth surface in its unstressed state. One of the screw-threaded parts is tightened into the other to squeeze the radially outer annular part of the elastomer ring between the abutment surfaces. The radially inner annular portion of the elastomer ring forms a resilient valve seat about the passage.

This valve is rendered relatively firm and is under stress due to the squeezing of the outer annular portion of the ring. The material at the surface of the valve seat is under tension. A hard valve member is contained in the passage between the valve seat and the inside space of the tank. A spring biases the valve member against the valve seat.

When the tank is to be refilled, the nozzle of a refilling container is inserted into the valve, and force is applied to the movable valve member, to lift it away from its seat. Residual gas pressure in the tank provides a short, abrupt burst of gas that leaves the tank. Thereafter the nozzle of the refilling container is pressed firmly and a temporary seal is formed that prevents further escape of gas from the tank. The increased force opens a valve of the refilling container, and liquefied gas under pressure is admitted to the tank.

The short burst of gas that leaves the tank at the beginning of the filling operation has two important purposes. First, the pressure in the tank is momentarily reduced. The pressure drops further in case there was some liquefied gas in the tank since some liquid in the tank evaporates, thus chilling the liquid and gas inside the tank and dropping the pressure, The reduced internal pressure in the tank facilitates entry of the refill charge of liquefied gas fuel. A second and important effect of the short blast of gas at the beginning of the refill operation is to blow away any dirt particles that may be present at or near the valve seat. The firm, stressed condition of the valve seat as described above, with its surface that is under tension, is ideally suited to eject any particles that might otherwise become embedded, and the short blast of gas leaving the tank is most effective in driving dirt particles away from the region of the valve seat.

This feature is used to best advantage in the form of lighter in which there is no dirt cover over the valve. In that form of lighter, the ball of the valve is easily seen because it is close to the exterior, and it is easily accessible to the refilling nozzle, Unfortunately, it is also directly exposed to dirt particles, but experience has shown it to be highly immune to such danger. The valve is extremely simple and renders refilling of the lighter an easy operation even to a novice.

The threaded parts include a metal flange that covers and protects the elastomer annulus that would otherwise be exposed to the exterior. The metal flange also guards against the possibility of excessive force being applied to the elastomer annulus by the refill nozzle and thus guards against damage. In this form of lighter, the external recess of the valve structure is minimized, so that that there is virtually no tendency of lint to collect in the recess, and there is no need for a lint cover.

Where it proves necessary to fit standard nozzles of liquefied gas supply containers, or where a valve cover is demanded, lighter tanks are here provided with novel forms of refilling valve assemblies, illustrating further features of the invention. For example, where the refilling nozzle has a sealing plug, the refilling valve should provide a puncturing means. As will be seen below, the invention provides simplified yet reliable refilling valves for lighters that cooperate with various forms of supply nozzles, and are capable of operating in accordance with the ideal refilling procedure described above.

The nature of the invention, its novel features and other objects and advantages will be apparent from the following detailed description of several illustrative refilling valve assemblies in the tanks of liquefied g gas fueled lighters.

These illustrative embodiments are shown in the accompanying drawings, wherein.

Figure 1:
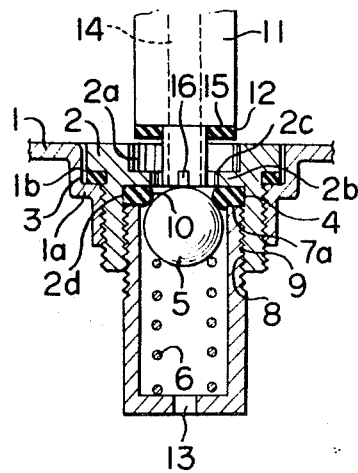
FIGS. 1 to 3 are longitudinal section views of one embodiment of the invention in different operating positions.
Figure 2:
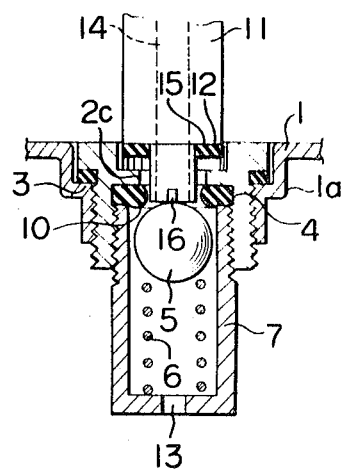
Figure 3:
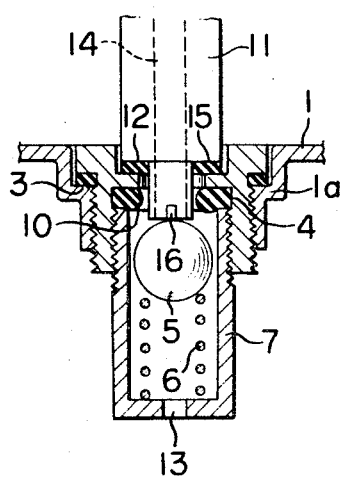
Figure 4:
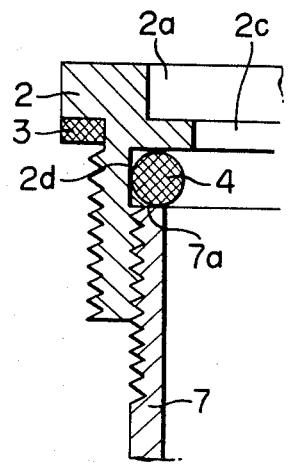
FIGS. 4 and 5 are enlarged fragmentary sectional views of the embodiment of FIGS. 1 to 3 showing how the valve seat is mounted.
Figure 5:
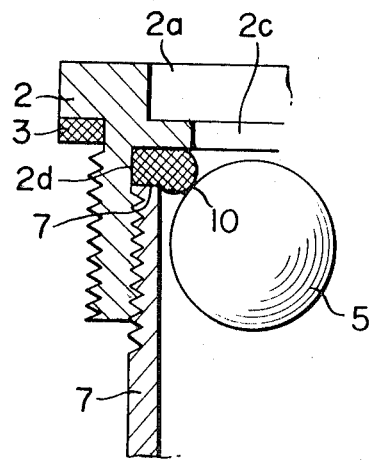

Referring now to FIGS. 1 to 3, a sleeve member 2 is threaded into a recessed collar or filling fitting 1b of wall 1 of a fuel tank or reservoir. A packing ring 3 on shoulder 1a of the recessed collar 1b provides a gas tight seal between the sleeve member 2 and the fitting 1b. Resilient annular member or ring 4 forms a valve seat. Ring 4 is made of a gastight elastomer such as rubber and has a circular section in its unstressed condition as shown in FIG. 4. The upper end 7a of tubular valve casing 7 forms an annular abutment surface engaging the radially outer annular portion of ring 4. Casing 7 having external threads 8 is threaded into internal threads 9 of sleeve member 2. Casing 7 and sleeve member 2 form a stationary tubular unit. A flange 2b forms an abutment surface opposite surface 7a, and when member 7 is tightened into member 2, the radially outer annular portion of ring 4 is squeezed. Smooth lateral wall 2d forms an outward confining surface for ring 4. The originally circular section of ring 4 is deformed to a large extent as shown in FIG. 5. The radially inner annular portion of ring 4 which is free of the squeezing pressure of member 7 expands radially inward and provides a relatively firm yet resilient stressed valve seat 10 whose surface is tensioned. Flange 2b covers the opposite external side of this radially inner annular portion of ring 4, and forms a seat for a filling nozzle, as explained more fully below. A ball valve member 5 that is located in tubular member 7 inward of the valve seat is biased toward the valve seat 10 and is normally retained in a closed position by means of a spring 6 which in turn bears against the bottom of the valve casing 7. An opening 13 is provided at the bottom of valve casing 7.

The fuel employed is subjected to pressure and is thereby liquefied for replenishing the tank with fuel, the nozzle of a container of conventional type is pushed down against the ball valve members. As this is done, the ball valve member 5 is displaced against the action of the spring 6 moves away from the stressed resilient annular member that forms the valve seat as shown in FIG. 2.

Tension of the spring 6 is selected so that a valve (not shown) of the fuel supply container is not opened when nozzle 11 first depresses ball 5. In the position shown in FIG. 2, therefore, the valve within the fuel supply container does not open and, on the other and, the space within the tank casing 1 communicates to the atmosphere through the gap between the ball valve member 5 and the valve seat 10. Any remaining fuel gas in the tank at greater than atmospheric pressure tends to be discharged. During this discharging process, though lasting only a moment, the pressure within the tank can be reduced rapidly. This results in a high filling efficiency in the subsequent filling process.

When the packing ring 12 on nozzle 11 comes into contact with the upper face of the flange 2b in the downward movement of the nozzle as shown in FIG. 3, the space within the tank is sealed off from the atmosphere. Then the valve within the supply container is opened so that the liquefied gas under the pressure of the supply container gushes through a passage 14 and notches 16 at the lower end of the nozzle 11, and into the tank casing 1. Gushing of the fuel ceases automatically when a balance is reached between the pressures within the fuel supply container and the tank. When the nozzle 11 of the fuel supply container is taken out after this filling process, the ball valve member 5 is forced against the valve seat 10 under pressure of spring 6 and under the fuel pressure within the tank casing 1, and thus ball 5 seals off the tank.

Flange 2b forms a seat for nozzle 11 and protects resilient ring 4 from damage. The external recess of the valve assembly is exposed when the lighter is in use, but this is extremely shallow. Ball 5 is extremely close to the exterior of the tank. There is little tendency for lint or other dirt particles to accumulate in the space 2a, or in the vary limited space above ball 5 within surface 2c of flange 2b. In any case, during the brief discharge of gas from the tank at the start of a refill operation, as described above and illustrated in FIG. 2, any free particles that might enter the valve are blown clear. The stressed surface-tensioned condition of the resilient valve seat 5 tends to expel and reject any dirt particles that might otherwise become embedded. As a result, this construction makes it practical to omit the usual valve cover. This coast is reduced accordingly and, more important, the person using the lighter is not burdened with having to remove the cover, holding it during the filling operation, and finally replacing it.

Figure 7:
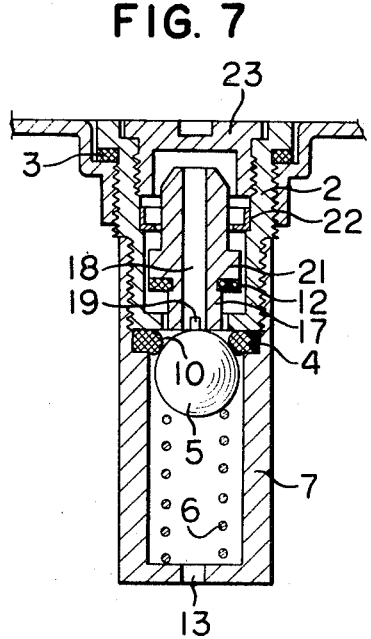
FIGS. 7 and 8 are longitudinal sectional views in different operating positions of another embodiment of some of the features in FIGS. 1–3 and illustrating further novel features.
Figure 8:
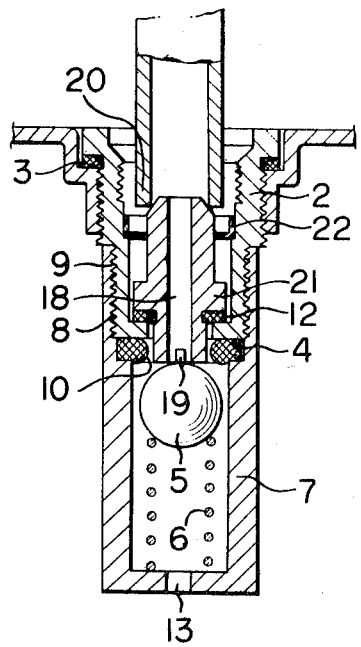
Figure 9:
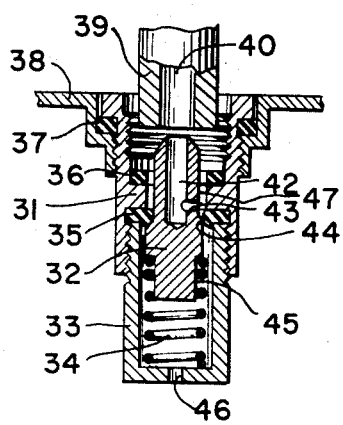
FIGS. 9 to 11 are longitudinal sectional views in different positions of a further embodiment of some of the features in FIGS. 1–3, and 7 and 8 and illustrating certain additional features.
Figure 10:
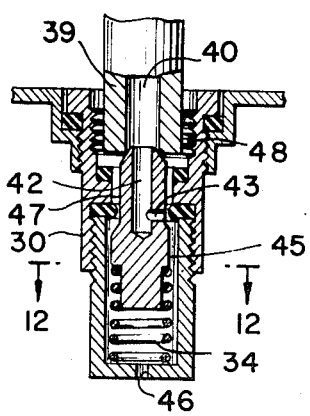
Figure 11:
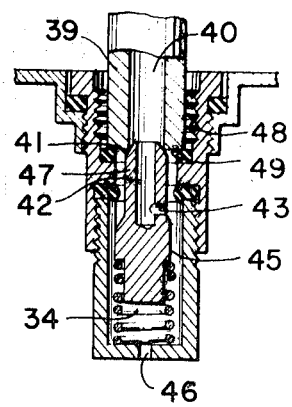

In the embodiment illustrated in FIGS. 7 and 8, an intermediate member or filling tube 17 is slidably guided in the sleeve member 2. The filling tube 17 is slidably guided in the sleeve member 2. The filling tube 17 has a flange 21 and notches 19 at its lower end. A packing ring or gasket 12 is secured to the lower face of the collar 21. A retaining ring 22 is fitted in the sleeve member 2, and prevents the filling tube 17 from falling out of the sleeve member. The diameter of the flange 21 is made slightly smaller than the inside diameter of the sleeve member 2 so that the gap thus produced between the collar 21 and the sleeve member 2 permits residual fuel gas within the tank to escape when ball 5 is unseated and until the filling tube 17 takes the position shown in FIG. 8. A screw plug or cap 23 is threaded into the sleeve member 2, covering the filling valve assembly between refilling operations.

The filling process of the fuel is carried out by pushing the nozzle 20 of a fuel supply container down against the filling tube 17 in the same way as described above in connection with FIGS. 2 and 3. There is a momentary venting effect that occurs between the time that the ball 5 is lifted from the valve seat and the time that flange 21 presses gasket 12 against the flange that covers the upper side of ring 4. Thereafter liquefied fuel gushes into the tank and the pressure in the tank rises until it is equalized with the pressure in the supply container.

Figure 6:
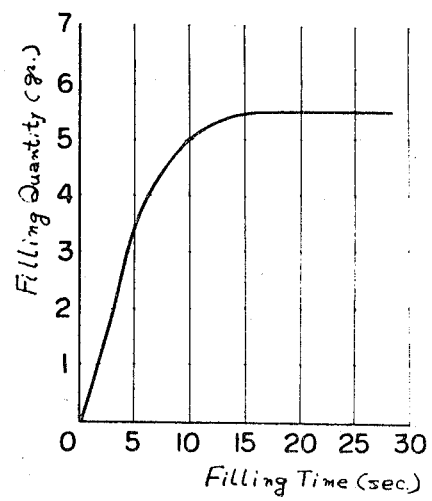
FIG. 6 is a diagram showing fuel-filling characteristics of the embodiment of FIGS. 1 to 3.

The filling characteristics of the filling device are shown in FIG. 6. It is clear that 5.5 grams or the fuel can be filled in the tank having capacity of 11 cubic centimeters. The filling process takes place in about 15 seconds.

The filling valve assembly of FIGS. 7 and 8 is useful with a standard form of fuel supply nozzle. Filling tube 17 transmits pressure applied by the fuel supply nozzle 20 to valve part 5. The valve assembly accommodates the first puff of gas leaving the tank at the start of a refilling operation, it seals off the escape passage, and it provides a filling passage 18, 19 from the supply nozzle to the unseated valve part 5. FIGS. 9 to 12 show a further improvement in a refilling valve of this type.

In FIGS. 9 to 12, a sleeve member 30 is internally threaded. Externally threaded valve casing 33 is screwed into sleeve member 30. The upper end of valve casing 33 is tightened against a resilient ring 35 of the same form and in the same manner as described above in connection with FIGS. 1–5, and generally with the same advantages. Sleeve 30 is screwed into an internally threaded opening in wall 38 of the tank of a liquefied-gas-fueled lighter, and gasket 37 seals sleeve 30 to wall 38.

A movable valve member operates in the stationary tubular unit 30, 33, the movable valve member including enlarged valve part 32 which has a sliding fit in the bore of valve casing 33. Valve part 32 is biased by compression coil spring 34 to seat against, and form a seal with, the firm but resilient stressed surface-tensioned valve seat 35. Sleeve 30 has a flange 31 extending radially inward. This flange overlies resilient ring 35 and it supports a gasket 36. Sleeve 30 has an outer cavity that loosely receives nozzle 39 of a supply container of liquefied gas fuel. The end of this nozzle is adapted to form a seal with seat or gasket 36. (Where a nozzle of soft plastic is used, gasket 36 may be omitted.) Before nozzle 39 reaches seat 36, it engages the upper or outer end of a filling tube 47 that extends as one piece from enlarged valve part 32. The outside diameter of filling tube 47 is smaller than the openings through valve seat 35, flange 31 and gasket 36. A bore 42 extends from the upper end of filling tube 47 to a lateral opening 43 through the wall of the filling tube. A flat 45 along one side of enlarged valve part 32 provides a fluid passage below conical seating surface 44 of the enlarged valve part 32. Valve casing 33 has an opening 46 into the tank or reservoir of the lighter.

The upper end of sleeve ember 30 is threaded internally to receive a valve cover. This cover is removed for a filling operation, and supply nozzle 39 is inserted. Bore 40 in the supply nozzle centers about the conical outer surface 41 at the end of movable valve member 32, 47. The outside surface of the nozzle has a clearance space 48 from the inside surface of sleeve member 30. When a nozzle is inserted, it is pressed to move the valve inward (downward in the drawings). A venting passage is formed when the parts reach the position shown in FIG. 10, extending from inside the tank to the atmosphere, through opening 46, along flat 45, past the unseated conical surface 44, and along the outside surfaces of filling tube 47 and nozzle 39. Gas pressure within the tank is reduced, and if liquefied gas is present in the tank it tends to evaporate and chill the tank, still further reducing the pressure in the tank. The drop in pressure is prominent even though there is only a short time between lifting of valve part 32 from valve seat 35 and sealing of the nozzle against gasket 36. This venting effect results not only from the provision of the venting passage to the atmosphere, but also because, when the valve is closed, filling tube 47 is long enough to project well above gasket 36.

After nozzle 39 reaches and seals with gasket 36, the venting phase of the operation ceases. A valve in the fuel supply container then opens. Such supply-container valves are conventionally operated by a substantial force applied to the nozzle. The force required to open the valve of such supply-container valves. Filling of the tank takes place in the manner described in connection with the refilling valve assemblies in FIGS. 1 and 7. Effective filling is thus accomplished by first reducing the tank pressure, and then filling the tank without wasting fuel.

Figure 13:
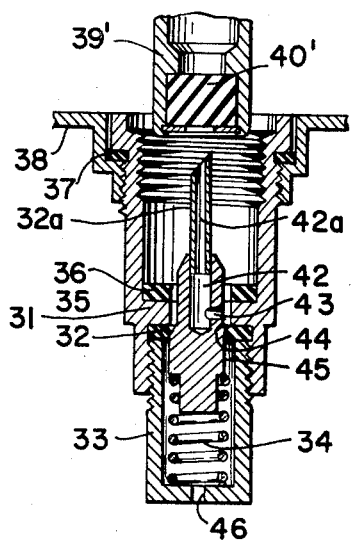
FIGS. 13 to 15 are longitudinal sectional views in different operating positions of a modification of the embodiment of FIGS. 9–11.
Figure 14:
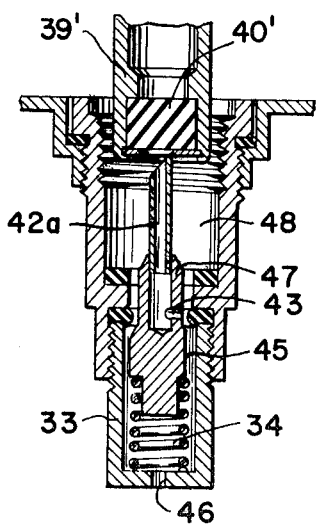
Figure 15:
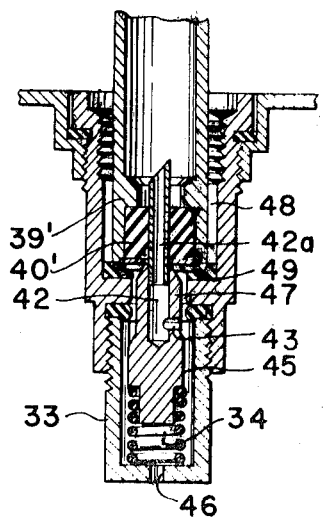
Figure 12:
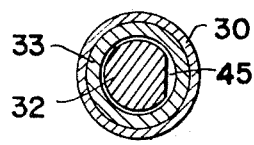
FIG. 12 is a cross-sectional view at the plane 12—12 in FIG. 10.

FIGS. 13 to 15 illustrate a modification of the refilling valve assembly shown in FIGS. 9 to 12. Corresponding numbers are used for like parts. The description of the construction and operation of the unchanged parts is omitted as superfluous. The construction of FIGS. 13 to 15 is adapted to use the type of fuel supply container that has a nozzle 39' having a closure or plug 40' of rubber or similar material. Filling tube 47 is extended to include a hollow needle 32a, producing a modified unitary movable valve member 32, 47, 32a. Bore 42a through the needle opens into bore 42 in the filling tube 47. The length of the needle (measured above the upper end of valve part 47) is greater then the space between the bottom of valve part 32 and the bottom of valve casing 33. This difference is such that there is assurance of needle 32a being positively forced through plug 40' when the nozzle 39' reaches gasket 36. The movable valve member can also be rigidly supported by the coil spring 34 in case all the turns of the spring touch one another so that the spring solidly supports the movable valve member during piercing of plug 40'.

As seen in FIG. 14, venting of the tank starts when needle 32a is first depressed by plug 40'. After enlarged valve part 32 reaches the bottom of valve casing 33, or after spring 34 provides solid support, further downward force on the nozzle causes the needle to penetrate through the plug, and nozzle 39' reaches gasket or seat 36. The venting process continues until that moment. After that moment, the filling process takes place. This is illustrated in FIG. 15, wherein needle 32a has penetrated plug 40' and has slipped upward until valve part 47 is stopped by the nozzle. In case spring 34 is not strong enough to drive the needle upward in this manner, then valve part 32 might touch the bottom of valve casing 33. Such contact would not normally seal the opening 46, but if such difficulty should occur it can be readily corrected.

Figure 16:
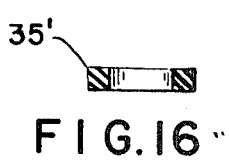
FIG. 16 is a transverse section through a modified elastomer ring useful as a valve seat in any of the embodiments of FIGS. 1, 7, 9 and 13.
Figure 17:
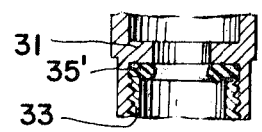
FIG. 17 is a fragmentary sectional view of the elastomer ring of FIG. 16 in its operating condition.

In each of the foregoing filling valve assemblies, the main valve seat is made of a resilient ring that is circular in section when it is not being stressed. When stressed, the ring presents a surface-tensioned smooth surface to the cooperating valve member. It is possible to form a valve seat of like characteristics otherwise, as shown in FIGS. 16 and 17. A gastight elastomer ring 35' as of rubber has a rectangular section when not stressed, as shown in FIG. 16. The inner cylindrical surface of the ring is smooth and continuous. When this ring has its radially outer annular part squeezed between threaded abutment members 31 and 33, the ring expands inward radially, and provides a firm yet resilient stressed surface-tensioned smooth valve seat, especially useful in the various valve assemblies described above.

It will be understood that details of the foregoing examples of construction that details of the foregoing examples of construction may be readily modified by those skilled in the art, so that the invention should be construed broadly in accordance with its spirit and scope.

What I claim is:

1. In a liquefied-gas-fueled lighter, a tank including a wall having an opening, and a refilling valve assembly sealed in said opening and extending from the opening into said tank, said refilling valve assembly including a stationary tubular unit having an outer part and an inner part threaded into outer, said parts having mutually opposed outer and inner coaxial abutment surfaces, a gastight elastomer ring of circular cross section in its unstressed condition having radially inner and outer annular portions, said radially outer annular portion being disposed between said abutment surfaces and tightly squeezed therebetween due to tightening of one of said screw-threaded parts into the other, the radially inner annular part of said elastomer ring forming a firmly resilient, stressed surface-tensioned valve seat when said outer annular portion of the elastomer ring is squeezed as aforesaid, a movable ball disposed immediately adjacent to the exterior of the tank at the side of said elastomer ring remote from the tank opening and having a surface adapted to form a seal with said surface-tensioned resilient valve seat when in contact therewith, a spring normally biasing said movable ball against said valve seat, the outer part of said stationary tubular unit including a flange providing said outer abutment surface and said flange virtually covering the entire ring in its stressed condition and thereby protecting said ring from nozzle thrust at the side of the ring facing the exterior of the tank and said flange forming an abutment against which a refilling nozzle can be pressed and sealed during the refilling operation, the ball being movable away from its seat by a small-diameter part of a refilling nozzle for tank venting prior to forcible engagement of a large-diameter part of the nozzle with said flange.

2. In a liquefied-gas-fueled lighter, a tank including a wall having an opening, and a refilling valve assembly sealed in said opening and extending from the opening into said tank, said refilling valve assembly including a stationary tubular unit having an outer part and an inner part threaded into said outer part, said parts having mutually opposed outer and inner coaxial abutment surfaces, a gastight elastomer ring having radially inner and outer annular portions, said radially outer annular portion being disposed between said abutment surfaces and tightly squeezed therebetween said abutment surfaces and tightly squeezed therebetween due to tightening of one of said screw-threaded parts into the other, the radially inner annular part of said elastomer ring having a smooth continuous surface in the unstressed state of the ring forming a firmly resilient, stressed surface-tensioned valve seat when externally outer annular portion of the elastomer ring is squeezed as aforesaid, a movable valve member including a seating part disposed at the side of said elastomer ring remote from the tank opening and said seating part having a surface adapted to form a seal with said surface-tensioned resilient valve seat when in contact therewith, a spring normally biasing said movable valve member against said valve seat, part of said movable valve member being accessible externally of said tank and engageable and operable by a refilling nozzle connected to a supply container of liquefied gas fuel for forcing said seating part away from said seat, the outer part of said stationary tubular unit including a flange providing said outer abutment surface ans said flange virtually covering the entire side of the ring facing the exterior of said tank, a gasket on said flange at the side of the flange facing the exterior of said tank, and said externally accessible part of said flange at the side of the flange facing the exterior of sad tank, and said externally accessible part of said valve member being a filling tube projecting toward the exterior of the tank and having an opening external of said seating part but internal of said flange when a refilling nozzle bears against the gasket for admitting fluid from the filling tube into the tank, said filling tube extending through said elastomer ring and said flange and said gasket, and said filling tube being engageable by the refilling nozzle to lift said seating part from said elastomer ring for venting said tank and, upon further insertion, the refilling nozzle bearing against said gasket supported by the flange to terminate the aforesaid venting.

3. In a liquefied-gas-fueled lighter, a tank including a wall having an opening, and a refilling valve assembly sealed in said opening and extending into said tank, said refilling valve including a stationary tubular unit having an inner annular valve seat and an outer annular seat for a refilling nozzle, a movable valve member including an enlarged valve part at the inner side of said inner valve seat adapted to seat against said inner valve seat and including a filling tube fixed to said enlarged valve part and extending outward through said inner and outer seats and beyond the outer seat when the enlarged valve part is seated, the lateral exterior of said filling tube being formed in relation to said valve seats to form an escape passage from the tank to the outside atmosphere when the enlarged valve part is unseated and for affording access by a refilling nozzle to said outer valve seat, said filling tube having an opening for admitting fluid into the filling tube from a refilling nozzle and having a longitudinal filling passage extending to a lateral opening external of said enlarged valve part but internal of said outer annular seat when a refilling nozzle is seated thereon, and a spring biasing said movable valve member outward for normally seating said enlarged valve part, so that a refilling nozzle connected to a supply container of liquefied gas fuel can align with said filling tube and momentarily depress the movable valve member partially to vent the tank, and so that full insertion of the refilling nozzle effects sealing of the refilling nozzle against said outer seat, opening of a valve of the supply container thereupon causing the tank to receive a charge of fuel.

4. Apparatus in accordance with claim 3, wherein said filling tube includes a hollow needle adapted to penetrate an end seal of a refilling nozzle.

5. Apparatus in accordance with claim 3, wherein said filling tube includes a hollow needle adapted to penetrate an end seal of a refilling nozzle, and wherein said stationary tubular unit has a portion limiting inward movement of said valve member to substantially less than the length of the needle for ensuring penetration of the needle through the end seal of the nozzle when the nozzle seats against said outer seat.

6. Apparatus in accordance with claim 3, wherein said enlarged valve part has a sliding fit in said stationary tubular unit and is formed laterally in relation thereto to provide a filling passage into the tank when the enlarged valve part is unseated.

7. In a liquefied-gas-fueled lighter, a tank including a wall having an opening, and a refilling valve assembly sealed in said opening and extending into said tank, said refilling valve assembly including a stationary tubular unit having a transverse integral flange and an inner annular valve seat and an outer annular seat for a refilling nozzle, said valve seats being of yieldable material and being fixed at opposite sides of said flange, a movable valve member including an enlarged valve part at the inner side of said inner valve seat adapted to seat against said inner valve seat and including a filling tube fixed to said enlarged valve part and extending outward through said flange and said inner and outer seats and beyond the outer seat when the enlarged valve part is seated, the lateral exterior of said filling tube being formed in relation to said valve seats for providing an escape passage from the tank to the outside atmosphere when the enlarged valve part is unseated and for affording access by a refilling nozzle to said outer valve seat, said filling tube having an opening to admit fluid from a refilling nozzle and having a longitudinal filling passage extending to a lateral opening for admitting fluid from the filling tube into the tank of the lighter, the lateral opening being disposed external of said enlarged valve part but internal of said outer annular seat for a refilling nozzle when the nozzle is seated, and a spring biasing said movable valve member outward for normally seating said enlarged valve part, so that a refilling nozzle connected to a supply container of liquefied gas fuel can align with said filling tube and momentarily depress the movable valve member partially to vent the tank, and so that full insertion of the refilling nozzle effects sealing of the refilling nozzle against said outer seat, opening of a valve of the supply container thereupon causing the tank to receive a charge of fuel.

8. Apparatus in accordance with claim 7, wherein said stationary tubular unit includes a tubular valve casing containing said spring and said enlarged valve part, said valve casing being open to the flow of fluids from the tank to said escape passage and to said lateral opening above said enlarged part when the enlarged valve part is not seated.

9. Apparatus in accordance with claim 7, wherein said stationary tubular unit is a two-part assembly including an upper tubular part fixed to the tank and bearing said flange as an integral part thereof and a tubular valve casing screw-threaded into said upper tubular part and containing said spring and said enlarged valve part, said inner seat being an annular elastomer having an annular radially outer portion and having an annular radially inner portion against which said enlarged valve part seats, said valve casing abutting and squeezing said radially outer portion of said inner valve seat against said flange to produce internal stress therein and to cause the radially inner annular portion to have a tensioned surface against which said enlarged valve part seats.